May 5, 1925.
A. VALLI
1,536,169
CLOCK
Filed May 28, 1924
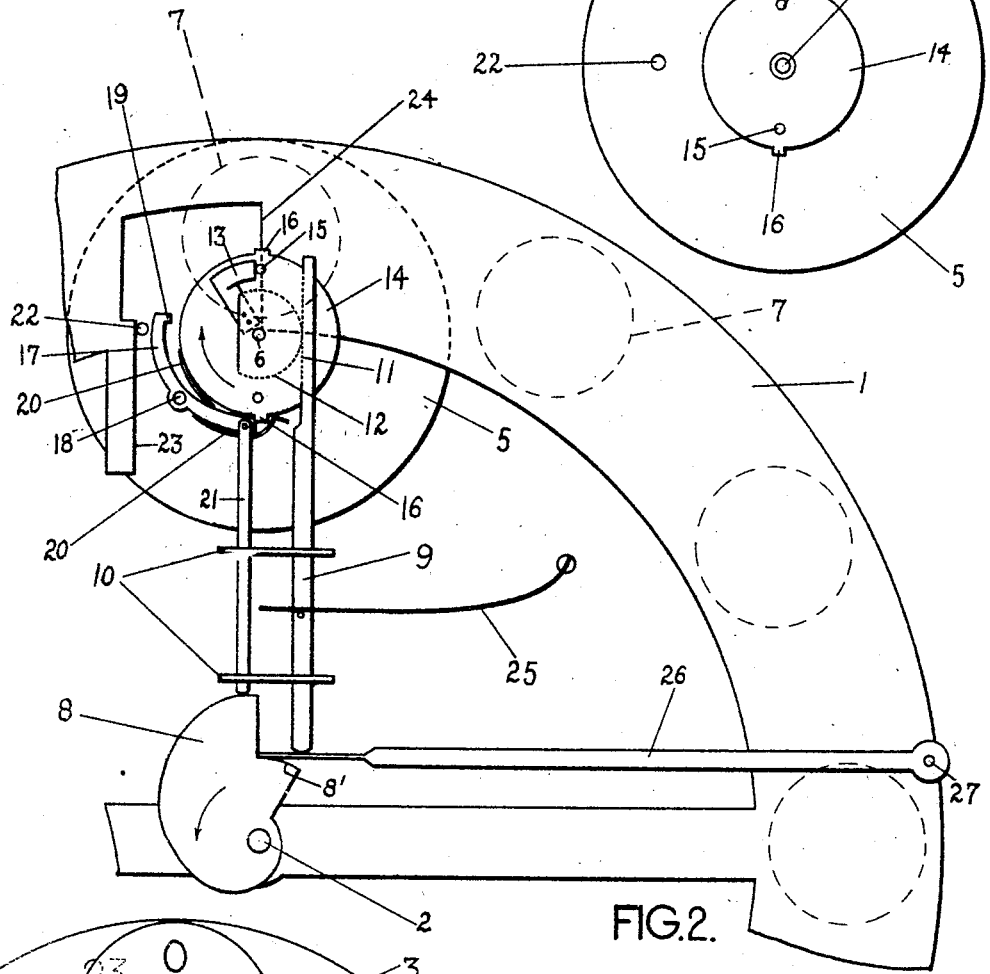
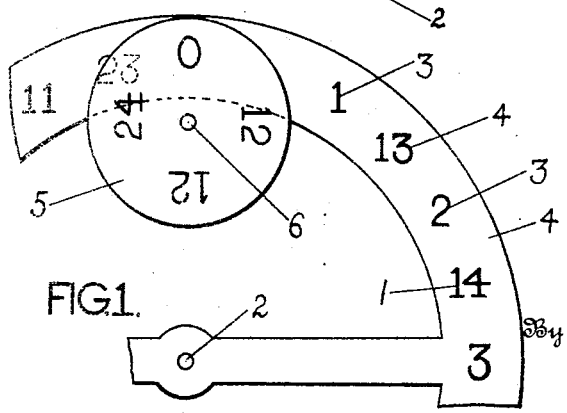
Inventor
Antonio Valli
By Emil Dönnelycke
Attorney Patented May 5, 1925.

1,536,169

UNITED STATES PATENT OFFICE.

ANTONIO VALLI, OF SANTA FE, ARGENTINA.

CLOCK.

Application filed May 28, 1924. Serial No. 716,438.

*To all whom it may concern:*

Be it known that I, ANTONIO VALLI, a subject of the King of Italy, residing at 476 Humberto I. Street, Santa Fe, Argentina, have invented certain new and useful Improvements in Clocks, of which the following is a specification.

My present invention relates to certain improvements in clocks or watches, its object being to provide a very simple and economical mechanism by which they can be transformed or converted into 24 hour clocks or watches.

In order that my present invention may be clearly understood and easily carried into practice, a preferred embodiment thereof has been shown in the appended drawings wherein—

Figure 1 is a part view of an oscillating disc having thereon the figures corresponding to the 24 hours and a supplemental disc having indicating numbers.

Fig. 2 is a schematic representation of the acting mechanism and Fig. 3 is a detail of the supplementary disc.

Similar characters of reference denote same or like parts throughout the said figures.

According to the present embodiment of my invention 1 is an annular disc pivoted at 2 and capable of oscillatory movement as hereafter explained. Said disc carries a series of numbers alternately disposed such as for instance (1 to 11 and 13 to 23) as shown in Figs. 3 and 4. 5 is a supplementary disc pivoted at 6 eccentrically with respect of the first named disc, said disc being provided at a distance corresponding to 90° with indicating figures 0, 12, 12 and 24.

On the axle 2, which is the main axle of the clock, there is a double cam 8 turning with said axle, said cam acting on a rod 9 guided at 10 and having at the other end a number of teeth 11 which mesh with corresponding teeth 12 of a wheel rotatably mounted on the axle 6. A dog 13 is connected to said last-named wheel which acts in one of the directions of movement upon a stop 15 fixed to a rotary disc 14 mounted in one piece with the disc 5.

Said disc 14 has two diametrically opposed salient stops 16 which are adapted to co-operate with a stop lever 17 pivoted at 18 and having a tooth 19 at one of its ends. Springs 20 coact with the said stop-lever to hold the said stop 16 at a predetermined position. A rod 21 connected with the lever 17 has its free end resting on the cam 8.

The oscillatory movement of the annular disc is effected by means of a stop or the like 22 on the disc 5 which acts on salients 23 and 24 of the annular disc 1. A spring 25 tends to bring the rack 9 against the cam 8 or conveniently against a lever 26 pivoted at 27 which rests upon the said cam surface.

The ordinary dial of the clocks has twelve equidistant openings 7 through which the one or the other of the above named series of numbers appears, the central upper opening showing one or the other of the numbers on the supplementary disc 5.

In the position shown, the elements of the clock correspond to a few minutes after midnight. On turning the cam 8 the stop lever 17 will be set free and one hour afterwards, the salient 8 of the cam will release the lever 26, whereby the wheel 12 will be given a quarter turn, carrying therewith the dog 13 and the disc 5 as will be easily understood. Number 12 will then appear at the head opening 7. The cam continuing to turn, the rack bar 11 will be gradually raised and the wheel 12 will make half a turn in a contrary direction. After twelve hours, a contrary quarter turn of the wheel 12 will be effected with the result that the following number 12 will appear behind the opening 7. One hour later, a like movement will follow, the result of which will be the appearance of number 24 on the supplementary disc and so on. Simultaneously, the annular disc 1 will be oscillated due to the contact of the stop 22 with one or the other of the salients 23 or 24 of the said annular disc, said stop 22 turning constantly with the said disc 5.

It is obvious that many constructional and other changes may be introduced without departing from the scope of the present invention which has been clearly set forth in the appended claiming clauses.

Having now fully described and ascer- tained the nature of my present invention and in what manner the same is to be carried into practice, I declare that what I claim and desire to protect by Letters Patent is:—

1. A device of the character described comprising a disc having a series of numbers thereon; a supplementary disc rotatably mounted having a plurality of numbers thereon adapted to cooperate with the series of numbers; a rotary control disc for said supplementary disc; and means for actuating said control disc which in turn actuates the first-named disc by means of said supplementary disc.

2. A device of the character described comprising a disc having a series of numbers thereon; a supplementary disc rotatably mounted having a plurality of numbers thereon adapted to cooperate with the series of numbers; a rotary control disc for said supplementary disc; and a cam and operating members for actuating said control disc which in turn actuates the first-named disc by means of said supplementary disc.

3. A device of the character described comprising a disc having a series of numbers thereon; a supplementary disc rotatably mounted having a plurality of numbers thereon adapted to cooperate with the series of numbers; a rotary control disc for said supplementary disc; means for limiting said control disc to intermittent rotation; and means for actuating said control disc to actuate said supplementary disc which in turn actuates the first-named disc.

4. A device of the character described comprising a disc having a series of numbers thereon; a supplementary disc rotatably mounted having a plurality of numbers thereon adapted to cooperate with the series of numbers; a rotary control disc for said supplemental disc; a stop lever for limiting said control disc to intermittent rotation; and means for actuating said supplementary disc which in turn actuates the first-named disc by means of said supplementary disc.

5. A device of the character described comprising a disc having a series of numbers thereon; a supplementary disc rotatably mounted having a plurality of numbers thereon adapted to cooperate with the series of numbers; a rotary control disc secured to said supplementary disc; a stop lever for limiting said control disc to intermittent rotation; and a cam and operating member for actuating said control disc and said first-named disc.

6. A device of the character described comprising a disc having a series of numbers thereon; a supplementary disc rotatably mounted having a plurality of numbers thereon adapted to cooperate with the series of numbers; a rotary control disc secured to said supplementary disc and having stops thereon; a dog adapted to abut against said stops to actuate said control disc; a stop lever for limiting said control disc to intermittent rotation; and means for actuating said control disc which in turn actuates the first-named disc by means of said supplementary disc.

7. A device of the character described comprising a disc having a series of numbers thereon and having a cut-out portion; a supplementary disc rotatably mounted having a plurality of numbers thereon adapted to cooperate with the series of numbers; a rotary control disc secured to said supplementary disc and having stops thereon; a dog adapted to abut against said stops to actuate said control disc; a stop lever for limiting said control disc to intermittent rotation; and means for actuating said control disc which in turn actuates the first-named disc by means of the cut-out portion.

8. A device of the character described comprising a disc having a series of numbers thereon; a supplementary disc rotatably mounted having a plurality of numbers thereon adapted to cooperate with the series of numbers; a rotary control disc integrally connected to said supplementary disc; a stop lever for limiting said control disc to intermittent rotation; a cam; a rod controlled by said cam to actuate said lever; and a second rod for actuating said control disc in order to shift the supplementary disc to indicate a different series of numbers.

9. A device of the character described comprising a disc having a series of numbers thereon; a supplementary disc rotatably mounted having a plurality of numbers thereon adapted to cooperate with the series of numbers; a rotary control disc integrally connected to said supplementary disc; a stop lever for limiting said control disc to intermittent rotation; a cam; a rod controlled by said cam to actuate said lever; a second rod for actuating said control disc in order to shift the supplementary disc to indicate a different series of numbers; and means for shifting said first-named disc.

10. A device of the character described comprising a disc having a series of numbers thereon; a supplementary disc rotatably mounted having a plurality of numbers thereon adapted to cooperate with the series of numbers; a rotary control disc secured to said supplementary disc and having stops thereon; a dog adapted to abut against said stops to actuate said control disc; a stop lever for limiting said control disc to intermittent rotation; a cam; a rod controlled by said cam to actuate said lever; and a second rod for actuating said control disc in order to shift the supplementary disc to indicate a different series of numbers.

11. A device of the character described comprising a disc having a cut-out portion; a supplementary disc cooperating with said first named disc; a control disc adapted to rotate with said supplementary disc; a stop lever for limiting said control disc to intermittent rotation; and means for actuating said control disc to actuate said supplementary disc and to actuate the first-named disc by means of said cut-out portion.

In testimony whereof I affix my signature.

ANTONIO VALLI.